(12) United States Patent
Oliveira et al.

(10) Patent No.: US 8,014,324 B2
(45) Date of Patent: Sep. 6, 2011

(54) TONE SIGNALING

(75) Inventors: Marcelo Oliveira, San Jose, CA (US); Alex Urquizo, Boxborough, MA (US); Wentao Fan, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 133 days.

(21) Appl. No.: 12/277,709

(22) Filed: Nov. 25, 2008

(65) Prior Publication Data

US 2010/0128724 A1 May 27, 2010

(51) Int. Cl.
H04B 7/005 (2006.01)
H04J 1/00 (2006.01)
(52) U.S. Cl. .......................... 370/278; 370/281
(58) Field of Classification Search .................. None
See application file for complete search history.

(56) References Cited

U.S. PATENT DOCUMENTS

| | | | |
|---|---|---|---|
| 4,554,542 A * | 11/1985 | Dolikian | 340/825.76 |
| 7,221,660 B1 | 5/2007 | Simonson et al. | |
| 2005/0277383 A1 * | 12/2005 | Reid | 455/15 |
| 2006/0098569 A1 * | 5/2006 | Han et al. | 370/208 |
| 2006/0221912 A1 * | 10/2006 | Olivier et al. | 370/338 |
| 2007/0064679 A1 * | 3/2007 | Chitturi | 370/352 |
| 2008/0045258 A1 | 2/2008 | Breidenstein | |
| 2008/0288543 A1 * | 11/2008 | Barnett | 707/104.1 |

OTHER PUBLICATIONS

Perkins, et al., "RTP Payload for Redundant Audio Data", Sep. 1997.
Schulzrinne et al., "RTP Payload for DTMF Digits, Telephony Tones and Telephony Signals", May 2000.

* cited by examiner

Primary Examiner — Jianye Wu
(74) Attorney, Agent, or Firm — Tucker Ellis & West LLP (57) ABSTRACT

In an example embodiment, there is disclosed an apparatus comprising a first communication interface, a second communication interface and tone control logic coupled to the first interface and the second interface. The tone control logic is operable to continuously transmit a guard tone on the second communication interface responsive to receiving data on the first communication interface, comprising data representative of a guard tone. The tone control logic is operable to discontinue transmitting the guard tone in response to a predefined event.

20 Claims, 5 Drawing Sheets

TONE SIGNALING

TECHNICAL FIELD

The present disclosure relates generally to tone signaling, such as tone control signals.

BACKGROUND

In public radios, for example, a large percentage of the radio systems' functions are controlled by specific tone frequencies. Some of these functions include, but are not limited to, keying the transmitter, changing channels, toggling monitor functions enabling/disabling scanning, sending multi-frequency tones, changing transmitter power levels, etc. For example, a Land Mobile Radio (LMR) gateway can have a first interface coupled to a network and a second interface coupled to a radio transceiver. The LMR Gateway (or "LMRG") may receive data representative of tones on the first interface (for example a sequence of tones) to play to configure the radio coupled to the second interface. The LMRG then plays the appropriate tones on the second (radio) interface.

BRIEF DESCRIPTION OF THE DRAWINGS

The accompanying drawings incorporated herein and forming a part of the specification illustrate the examples embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a first communication interface, a second communication interface, and tone control logic coupled to the first interface and the second interface. The tone control logic is operable to continuously transmit a guard tone on the second communication interface responsive to receiving data on the first communication comprising data representative of a guard tone. The tone control logic is responsive to discontinue transmitting the guard tone in response to a predefined event.

In accordance with an example embodiment, there is disclosed herein, a method comprising receiving a data packet comprising tone data on a first interface, and determining whether the tone data contains data representative of a guard tone. The method further comprises transmitting a tone on a second interface responsive to determining the tone data contains data representative of a guard tone, wherein the tone is continuously transmitted on the second interface while data representative of audio data received on the first interface is being transmitted on the second interface.

In accordance with an example embodiment, there is disclosed herein logic encoded in one or more tangible media for execution and when executed operable to receive a plurality of data packets containing tone data and a timestamp from a first communication interface. The logic is further operable sort the plurality of data packets by timestamp and discard at least one packet having a duplicate timestamp of a second packet. The logic is still further configured to generate tone frequencies based on the sorted data packets on a second communication interface, and to transmit a guard tone on the second interface responsive to determining one of the plurality of data packets contains data representative of a guard tone. An audio signal is transmitted on the second interface corresponding to the data representative of an audio signal received on the first interface. The guard tone is discontinued when transmission of the audio signal on the second interface has completed.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In accordance with an example embodiment, described herein a predefined packet format that can be used for reliably transmitting Radio Tone Control signals to a network of interconnected Land Mobile Radios. This allows multiple radios in an IP (Internet Protocol) network to be controlled reliably and independently as long as the control packets are routable within this network. Since a radio network might be comprised of thousands of radio channels but only a few actual radios, dynamic radio control can be a desirable feature.

Radio Tone Control is achieved via the use of a contiguous sequence of single or multi-frequency tones which are played to the radio in the proper order, timing, and DB levels. An example embodiment also includes a technique to increase reliability and insure that these tones will be played properly and in order. For example, because of discrepancies within the IP network itself, some packets may be subject to packet loss and unpredictable routing, which could expose the system to many glitches and cause a tone control operation to fail. This in accordance with an example embodiment, the whole tone control sequence for a radio is sent in a single packet, such as an RTP packet. This single packet can be retransmitted multiple times to overcome issues related to packet loss and unpredictable routing. Repeated packets are not replayed by the receiving endpoint since they can be detected as duplicates. The result is a reliable infrastructure, where tone control operations are either fully performed or not performed at all.

In an example embodiment, a data format enables data representative of a guard tone (such a low level guard tone "LLGT") to be sent in a packet that signals a radio gateway or other device providing tone control signals to the radio to play the tone to the radio for the whole time a "push to talk" operation (or video and/or audio transmission) is being performed. Thus an endpoint does not have to keep sending packets every 20 to 30 ms while the endpoint is transmitting to maintain the guard tone, which can improve reliability. For example, if an endpoint has to send a packet with a guard tone every 20 to 30 ms, and some of these packets are lost, the radio might unkey and the endpoint transmission would be partially lost. Thus, in accordance with an example embodiment, a low level guard tone "LLGT" is encapsulated into a single packet before any voice transmission is sent to the radio. A radio gateway or other device providing tone control signals to the radio can be configured to detect that the LLGT is meant to be generated for as long as some audio traffic is being sent uninterruptedly to the radio within the boundaries of guard times.

Figure 1:
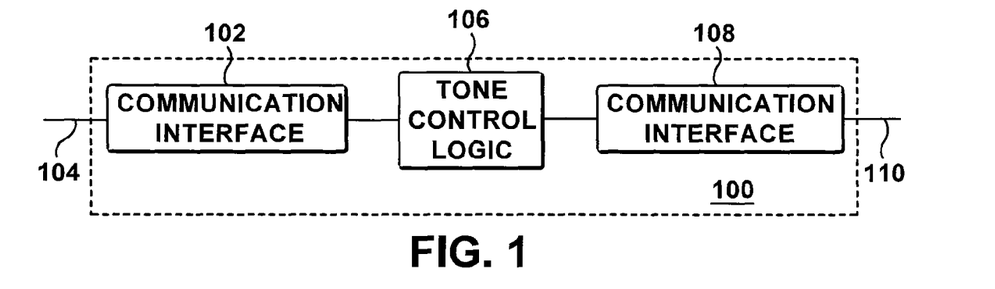
FIG. 1 illustrates an example of an apparatus for generating tone signals.

Referring to FIG. 1, there is illustrated an apparatus 100 in accordance with an example embodiment. Apparatus 100 comprises a first communication interface 102 coupled to a first communication link 104. Communication link 104 is suitably any wired or wireless communication media. First communication interface 102 is configured to communicate via first communication link 104.

Apparatus 100 further comprises tone control logic 106 coupled to communication interface 102. "Logic", as used herein, includes but is not limited to hardware, firmware, software and/or combinations of each to perform a function (s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

A second communication interface 108 is coupled to tone control logic 106 and to a second communication link 110. Communication link 110 is suitably any wired or wireless communication media. First communication interface 108 is configured to communicate via first communication link 110.

In an example embodiment, tone control logic 106 is responsive to receiving data on first communication interface 102, that comprises data representative of a guard tone, to continuously transmit a guard tone on second communication interface 108. Tone control logic 106 is operable to discontinue transmitting the guard tone in response to a predefined event.

In an example embodiment, (see for example FIG. 3), the data received on first interface 108 comprises a duration field. The data representative of a guard tone is contained in a duration field. For example, a value of zero in the duration field can indicate a guard tone.

In an example embodiment, tone control logic 106 receives data representative of an audio signal via first communication interface 102. Tone control logic 106 generates an audio signal based on the data representative of the audio signal. Tone control logic 106 mixes the audio signal with the guard tone, and the mixed signal is transmitted on second communication interface 108.

Figure 2:
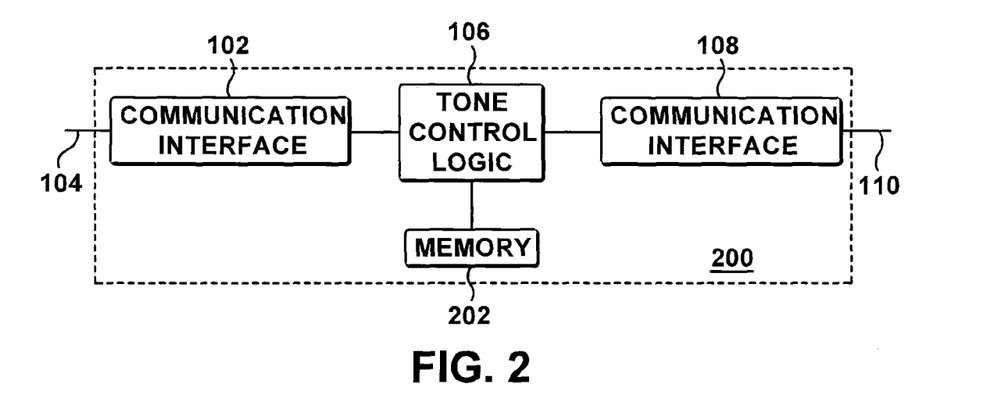
FIG. 2 illustrates an example of an apparatus for generating tone signals with an associated memory.

In an example embodiment, tone control logic 106 further comprises a memory for storing a history of data received on the communication interface. This enables tone control logic 106 to determine whether data received on the first communication interface is a duplicate of data already received on the first communication interface. For example, in order to increase reliability, the device sending a tone packet may send multiple copies of the packet to increase the chances a packet will be received by tone control logic 106, this increasing the reliability of tone signals transmitted on second communication interface 108. For example, as will described herein infra, if first communication link 104 is a network, such as an Internet Protocol ("IP") network, there is a risk that some packets containing tone signaling may not be delivered. Sending multiple copies of the packet increases the chances that the tone signaling data will be received by apparatus 100. Thus, tone control logic 106 can determine whether a packet received on communication interfaced 102 is a duplicate of a previously received packet, and if so, tone control logic 106 is operable to discard the duplicate packet. Tone control logic 106 may suitably comprise an internal memory or may be coupled to a memory 202 as illustrated in apparatus 200 (FIG. 2).

In an example embodiment, packets received on first interface comprise timestamp data. Tone control logic 106 may be configured to acquire the timestamp from packets received on first communication interface 102. In particular embodiments, tone control logic 106 is operable to compare a timestamp associated with data received on first communication interface 102 to data stored in the memory (such as for example memory 202 in FIG. 2) to determine whether a tone sequence has already been played.

In an example embodiment, the data received on first interface 102 comprises data representative of a plurality of tones, an example of how a plurality of tones may be received will be described herein infra (see FIG. 3). Tone control logic 106 transmits a plurality of tones in a continuous sequence based on the data representative of a plurality of tones. In particular embodiments, data indicative of guard tone is a last tone in the data.

In an example embodiment, a plurality of data packets are received via first communication interface 102. The plurality of data packets comprise data representative of a tone and data representative of a timestamp. Tone control logic 106 is operative to transmits tones on interface 108 based on the data representative of a tone ordered by the data representative of a timestamp. In particular embodiments, the data representative of a tone comprises data representative of a tone frequency, a tone power level and a tone duration.

In an example embodiment, which will described herein infra, communication link 104 is coupled to an Internet Protocol (IP) network and first communication interface 102 is operable to receive IP packets on the first communication interface. This can enable apparatus 100 to receive data from multiple devices connected on the IP network.

In an example embodiment, second communication interface 108 is operable to communicate with a plurality of wireless transceivers that are coupled to the second communication interface. For example multiple radios may be coupled to communication link 110. The radios may be suitably configured to respond to tone control commands to perform actions (such as keying a transmitter) or to configure the radio (for example to select a channel). Any physically realizable number of wireless transceivers may be coupled to communication link 110.

Figure 3:
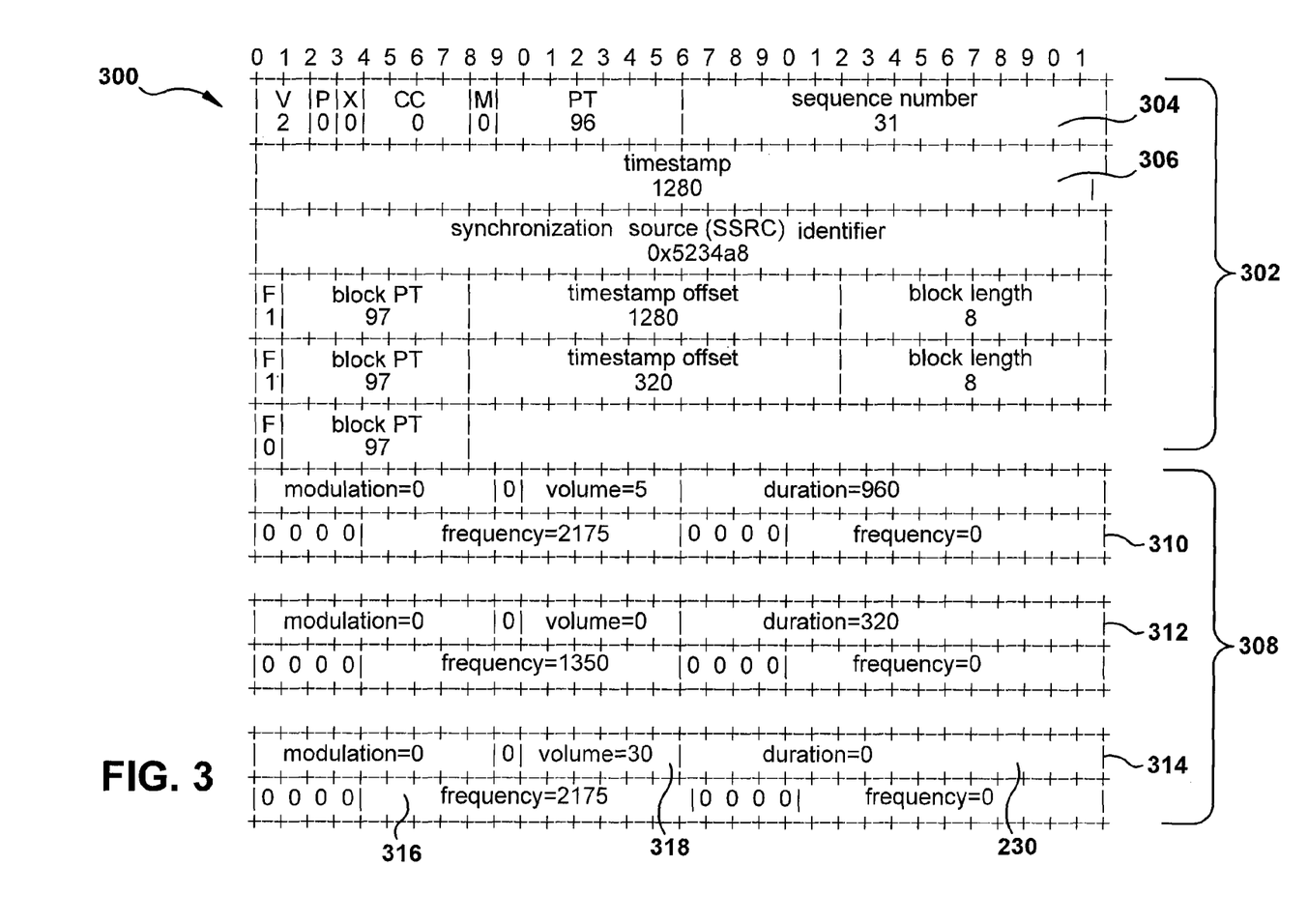
FIG. 3 illustrates an example of a data packet format for communicating data representative of tone frequencies.

FIG. 3 illustrates an example of a data packet format 300 for communicating data representative of tone frequencies.

Packet format 300 comprises a header portion 302 that contains a sequence number 304 and a timestamp 306. The sequence number and timestamp, and optionally other data in the header, may be employed to detect duplicate packets.

The data (sometimes referred to as payload) portion 308 of packet 300 comprises data representative of tones. In the example illustrated in FIG. 3, data portion 308 contains three tones 310, 312, 314. For example tone 310 has a volume (power level or amplitude) of 5, a frequency of 2175 Hz and a duration of 960 (in timestamp units, for example if a timestamp unit=1 millisecond then a value of 960 would represent 960 milliseconds). Tone 312 represents a 1350 Hz tone played for 320 timestamp units at a power level of 10. Tone 314 indicates a guard tone. The guard tone is indicated by a duration 230 of zero "0." The frequency 316 of the tone is 2175 Hz, and the power level is 30.

In an example embodiment, when packet 300 is received by tone control logic 106 (FIG. 1), three tones are generated in sequence. First, tone 310 (960 Hz at volume level 5) at time (T)=0 for 960 timestamp units; second, tone 312 (1350 Hz at volume level 10) at T=960 timestamp units for 320 timestamp units; and third, tone 314 (2175 Hz at volume 30) at T=1280 timestamp units. The guard tone is continuously played until a predetermined event occurs. For example, if an audio signal is also being generated, the tone is generated until transmission of the audio signal has completed.

Figure 4:
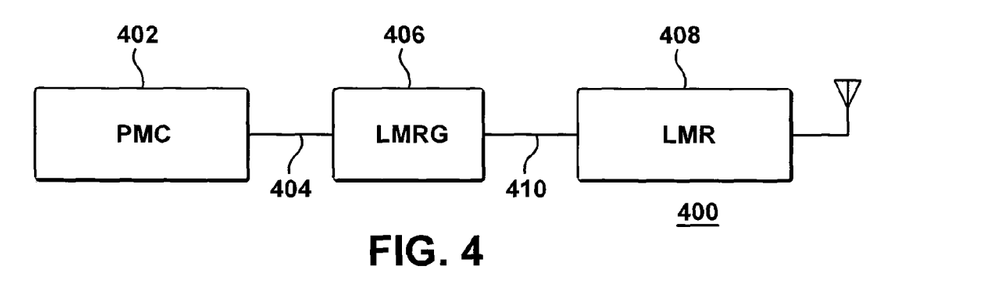
FIG. 4 is a block diagram illustrating an example of a system employing tone control signals.

FIG. 4 is a block diagram illustrating an example of a wireless system 400 employing tone control signals. In this example embodiment, a Push to Talk Media Center (PMC) 402 that suitably comprises at least one interface enables a user to operate a wireless Land Mobile Radio (LMR) 408 via a Land Mobile Radio Gateway (LMRG) 406.

In the illustrated example, PMC 402 is coupled to LMRG 406 via a first network 404. In an example embodiment, first network 404 is an Internet Protocol ("IP") compatible network, however, network 404 may employ any suitable networking protocol. In addition, more than one PMC 402 may be coupled to network 404, only one PMC is shown for ease of illustration of the example embodiment. Similarly LMRG 406 is coupled to LMR 408 via a second network 410. Network 410 can be an analog network which will allow audio signals, including tone signals, to be transmitted by LMRG 406 to LMR 408.

In an example embodiment, when a user wishes to transmit via LMR 408 and/or change the configuration of LMR 408, the user employs a user interface at PMC 402. A data packet is transmitted from PMC 402 along network 402 to LMRG 406. LMRG 406 then converts the data packet into audio tones sent on network 410 to LMR 408. In accordance with an example embodiment, if LMRG 406 receives a data packet with data indicating a guard tone should be sent, LMRG sends the guard tone until an event, such as completion of sending an audio signal to LMR 408.

Figure 5:
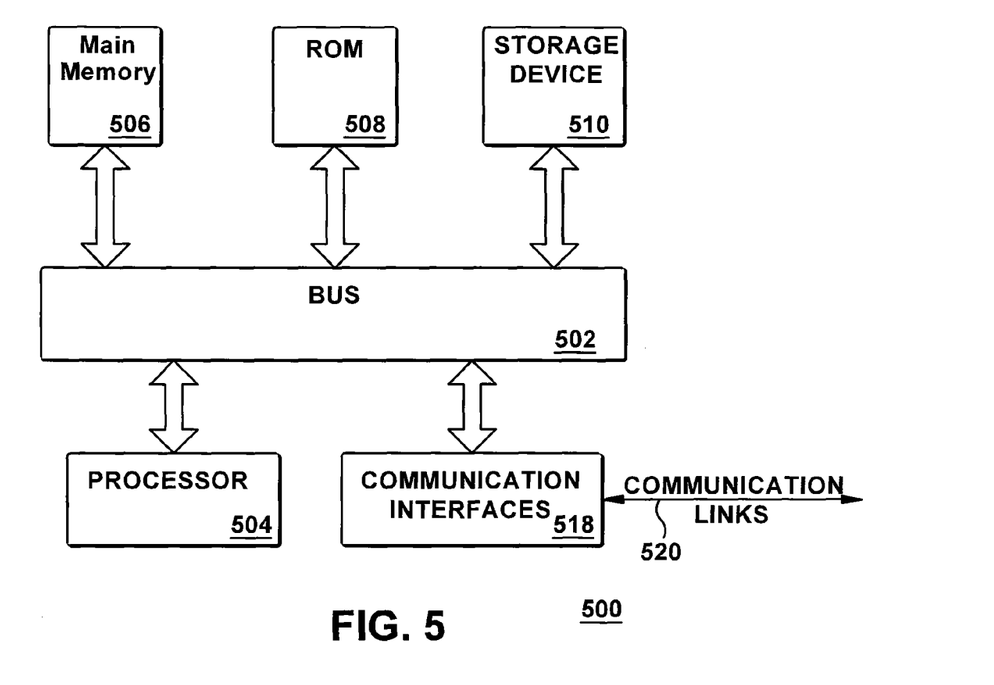
FIG. 5 illustrates an example of a computer system upon which an example embodiment may be implemented.

FIG. 5 is a block diagram illustrating an example of a computer system 500 upon which an example embodiment may be implemented. For example, computer system 500 is suitable for implementing apparatus 100 (FIG. 1), apparatus 200 (FIG. 2) and LMRG 406 (FIG. 5). Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the example embodiment is related to the use of computer system 500 for tone signaling. According to an example embodiment, tone signaling is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, volatile media, and transmission media. Non-volatile media include for example optical or magnetic disks, such as storage device 510. Volatile media include dynamic memory such as main memory 506. Transmission media include coaxial cables, copper wire and fiber optics, including the wires that comprise bus 502. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 504 for execution. For example, the instructions may initially be borne on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506 from which processor 504 retrieves and executes the instructions. The instructions received by main memory 506 may optionally be stored on storage device 510 either before or after execution by processor 504.

Computer system 500 also includes communication interfaces 518 coupled to bus 502. Communication interface 518 provides a two-way data communication coupling computer system 500 to communication links 520. In an example embodiment, communication links 520 are coupled to local area networks. For example, one communication interface may receive tone control data from a first network, which processor 504 may convert to audio tones that are transmitted via the second communication interface over a second network.

Figure 6:
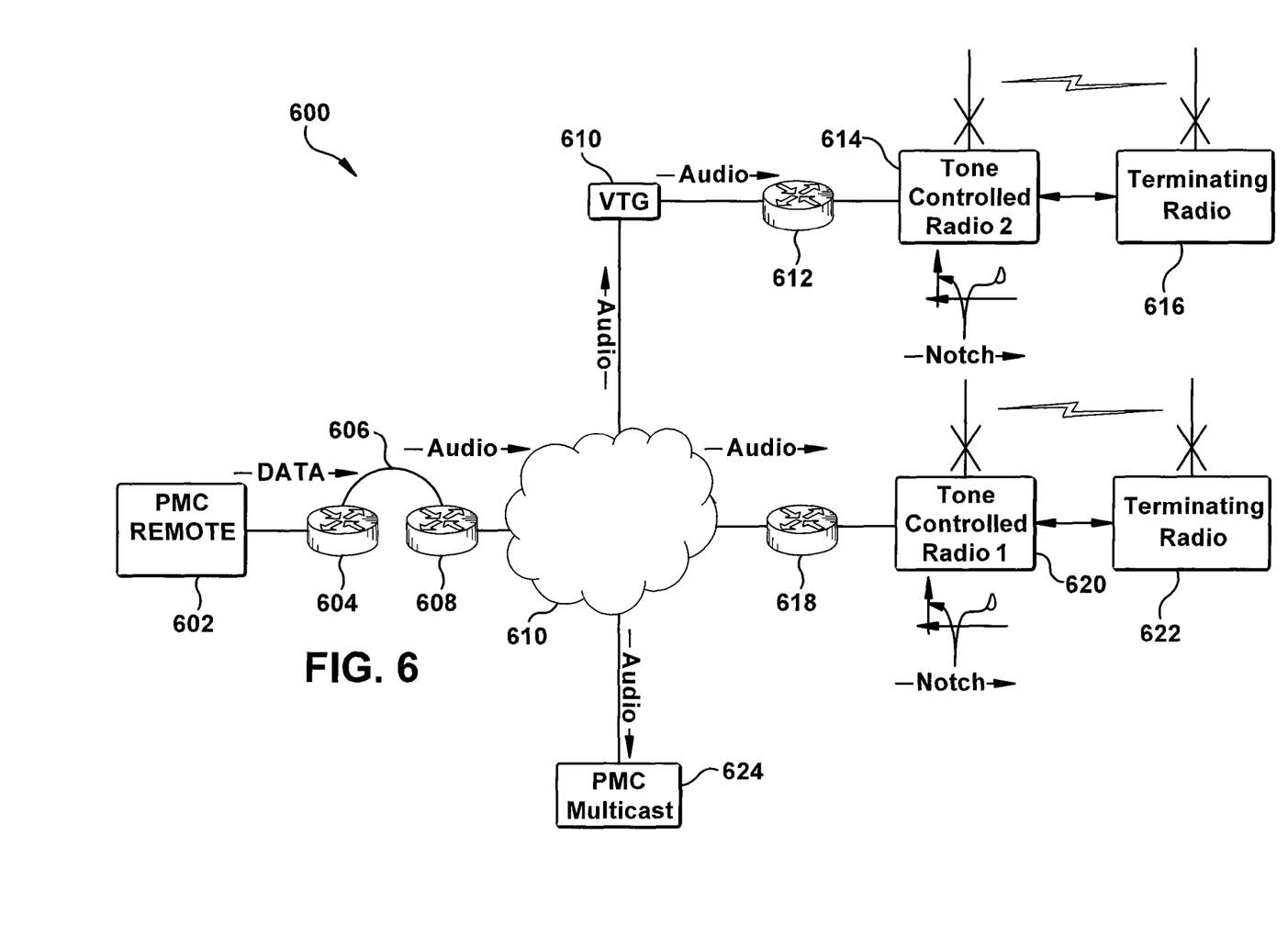
FIG. 6 illustrates an example of a Land Mobile Radio system configured to operate in accordance to an example embodiment.

FIG. 6 illustrates an example of a Land Mobile Radio system 600 configured to operate in accordance to an example embodiment. System 600 comprises a Push-to-talk Management Center (PMC) 602 that provides a user interface for operating and monitoring radios, e.g. radio 614 and 620. PMC 602 sends data that is routed onto router 604 across network 606 to a radio gateway (router) 608. Radio gateway 608 converts data sent from PMC 602 to analog audio signals that are transmitted on network 610.

Audio signals on network 610 routed to a Virtual Talk Group (VTG) 611. The audio signals provided to VTG 611 are routed to router 612, and forwarded to tone controlled radio 614. In an example embodiment, tone controlled radio 614 comprises a notch filter that filters out tone control signals from being transmitted to radio 616.

Audio signals on network 610 are also routed via router 618 to radio 620. Radio 620 may also suitably comprise a notch filter to filter out tone control signals so they are not sent to terminating radio 622.

In addition, audio signals may be provided to a multicast group (PMC Multicast) 624. These signals may be routed to other radios or to other devices coupled to network 610, or to other networks that are in communication with network 610.

In an example embodiment, radio 614 and 620 may be configured to respond to tone control signals. Radios 614, 620 may be configured to respond to different tone sequences to allow for control of one radio at a time. For example, a user may wish to transmit on radio 614. The user selects the appropriate configuration for radio 614 using the user interface provided by PMC 602 and activates the transmitter (for example activating push to talk). PMC 602 generates a data packet that includes a tone sequence commanding radio 614 to commence transmitting. The tone sequence may further include a data representative of a guard tone. The packet is routed via router 604 over network 606 to router 608. Router 608 plays the sequence of tones (audio) over network 610. Because the sequence is for radio 614, the tone sequence may be ignored by radio 620. The tone signals are routed to VTG 611 that comprises router 612 which provides the radio signal to radio 614. Radio 614 then commences transmitting. Because the packet sent by PMC 602 comprised data representative of a guard tone, router 608 continues to transmit the low level guard tone on network 610 while receiving audio data from PMC 602. PMC 602 converts the audio data to audio signals routed on network 610. The low level guard tone may be mixed with the tone signal by router 608. Upon completing transmission of the audio signals from PMC 602, router 608 will stop transmitting the low level guard tone on network 610.

In particular embodiments, PMC 602 may transmit the data packet containing the tone control data may be sent multiple times on network 606 to increase the chances that the tone control data is received by router 608. Router 608 may suitably comprise a history buffer that allows router 608 to determine whether a received data packet has already been received, and if so to discard the packet.

In an example embodiment, data packets sent by PMC 602 are time stamped. This enables router 608 to play tone sequences in the order sent by PMC 602. For example, router 608 may sort packets by timestamp. This may also allow router 608 to detect duplicate packets, which router 608 discards.

Figure 7:
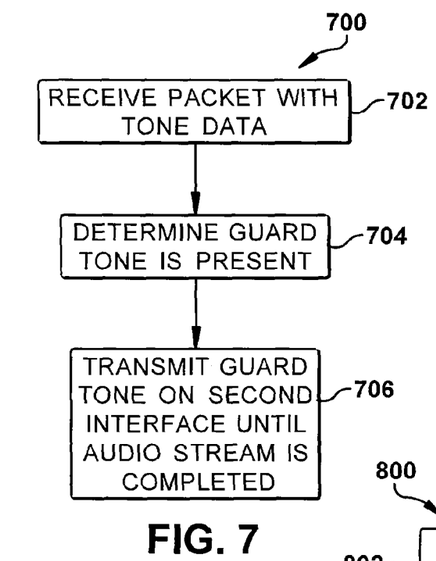
FIG. 7 illustrates a methodology for generating tone signals in accordance with an example embodiment.
Figure 8:
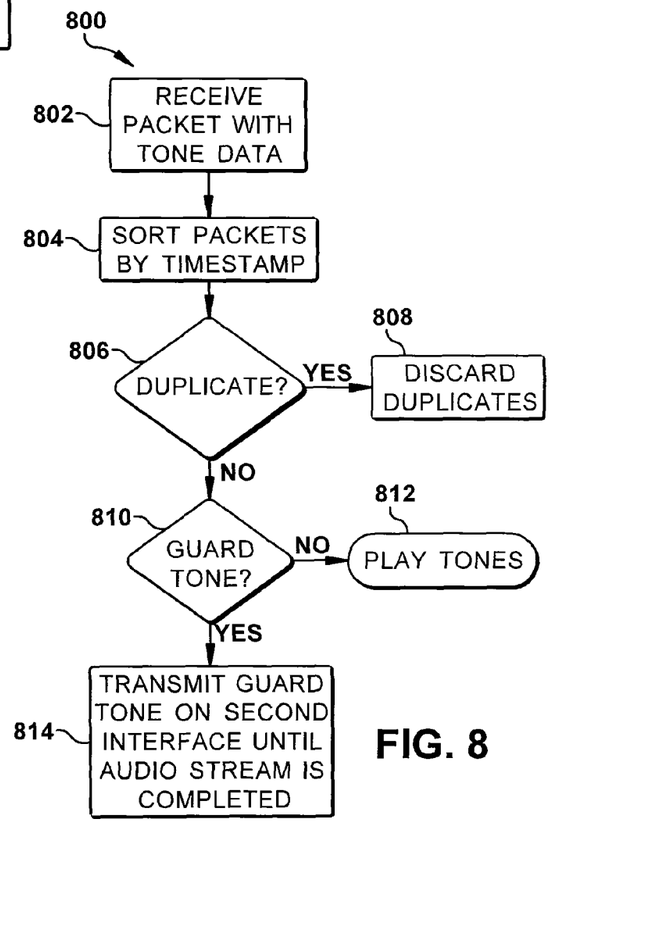
FIG. 8 illustrates a methodology for generating tone signals that includes checking for duplicate packets.

In view of the foregoing structural and functional features described above, methodologies in accordance with example embodiments will be better appreciated with reference to FIGS. 7 and 8. While, for purposes of simplicity of explanation, the methodologies of FIGS. 7 and 8 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement the methodologies described herein in accordance with an example embodiment. The methodologies described herein are suitably adapted to be implemented in hardware, software, or a combination thereof.

FIG. 7 illustrates a methodology 700 for generating tone signals in accordance with an example embodiment. Methodology 700 comprises receiving a data packet with tone data on a first communication interface as illustrated at 702. In an example embodiment, the packet contains data representative of a plurality of tones. The packet may be formatted as illustrated in FIG. 3 described herein supra.

In an example embodiment, the data packets may include a timestamp and/or a sequence number. The device receiving the data packets can then sort the packets by timestamp. This will enable the device to play the tones in the same sequence as they were sent, and will also enable the device to detect duplicate packets. For example, if multiple packets are received with the same timestamp and/or sequence number, only one copy of the packet is played and the remaining copies are discarded.

At 704, method 700 determines whether a guard tone is present in the packet. In particular embodiments, the guard tone is the last tone in a packet containing a plurality of tones. The guard tone may be detected by searching for tone data in a predefined format. For example, determining whether a guard tone is present may suitably comprise determining whether a tone in the packet has a predefined duration value, such as zero. In other embodiments, other tone data fields may contain data indicating the tone is a guard tone.

At 706, the guard tone is transmitted on a second interface. In an example embodiment, the guard tone is transmitted continuously while an audio stream received on the first interface is being transmitted on the second interface. In particular embodiments, the guard tone an audio signals are mixed before transmitting on the second interface. Transmission of the guard tone stops after sending of the audio stream on the second interface has finished.

FIG. 8 illustrates a methodology 800 for generating tone signals that includes checking for duplicate packets. Methodology 800 comprises receiving a data packet with tone data on a first communication interface as illustrated at 702. In an example embodiment, the packet contains data representative of a plurality of tones. The packet may be formatted as illustrated in FIG. 3 described herein supra.

At 804, the packets is sorted by its timestamp. This will enable the device to play tones in the same sequence as they were sent, and will also enable the device to detect duplicate packets.

At 806 a check is made to determine whether the received packet is a duplicate of a previously received packet. If the packet is a duplicate packet (YES), at 808 the duplicate packets are discarded. For example, if multiple packets are received with the same timestamp and/or sequence number, only one copy of the packet is played and the remaining copies are discarded.

If at 806 a determination is made that the packet is not a duplicate (NO), at 810, method 800 determines whether a guard tone is present in the packet. In particular embodiments, the guard tone is the last tone in a packet containing a plurality of tones. The guard tone may be detected by searching for tone data in a predefined format. For example, determining whether a guard tone is present may suitably comprise determining whether a tone in the packet has a predefined duration value, such as zero. In other embodiments, other tone data fields may contain data indicating the tone is a guard tone. If no guard tone is detected at 810 (NO), the tones are output pursuant to the data contained within the data packet.

If at 810, a determination is made that the packet contains a guard tone (YES), at 814, the guard tone is transmitted on a second interface. In an example embodiment, the guard tone is transmitted continuously while an audio stream received on the first interface is being transmitted on the second interface. In particular embodiments, the guard tone and audio signals are mixed before transmitting on the second interface. Transmission of the guard tone stops after sending of the audio stream on the second interface has finished.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
a first communication interface;
a second communication interface;
tone control logic coupled to the first interface and the second interface;
wherein the tone control logic receives a single data packet with data representative of a guard tone on the first interface, the data representative of a guard tone comprises a frequency for the guard tone;
wherein the tone control logic transmits, uninterrupted, the guard tone on the second communication interface at the frequency for the guard tone responsive to receiving single data packet on the first communication interface;
wherein the tone control logic receives data packets on the first interface that comprises audio tone data;
wherein the tone control logic converts audio tone data in the data packets into audio tones to be transmitted via the second interface; and
wherein the tone control logic transmits the guard tone before sending audio tones, uninterruptedly, as long as audio tone data is being received via the first interface within a guard time.

2. The apparatus set forth in claim 1, wherein the data packet received on the first interface comprises a duration field, and the data representative of a guard tone is contained in a duration field.

3. The apparatus set forth in claim 2, wherein a value of zero in the duration field indicates a guard tone.

4. The apparatus set forth in claim 1, wherein the tone control logic receives data representative of an audio signal on the first communication interface;
wherein the tone control logic generates an audio signal based on the data representative of the audio signal; and
wherein the tone control logic mixes the audio signal with the guard tone, and the mixed signal is transmitted on the second communication interface.

5. The apparatus set forth in claim 1, wherein the tone control logic further comprises a memory for storing a history of data received on the communication interface.

6. The apparatus set forth in claim 5, wherein the tone control logic is configured to determine whether the data packet received on the first communication interface is a duplicate of a data packet already received on the first communication interface; and
wherein the tone control logic discards the data packet received on the first interface responsive to determining the data packet is a duplicate of a data packet already received on the first communication interface.

7. The apparatus set forth in claim 6, wherein the data packet received on the first communication interface comprises a timestamp; and
wherein the tone control logic compares a timestamp associated with the data packet received on the first communication interface to a data packet stored in the memory to determine whether a tone sequence has already been played.

8. The apparatus set forth claim 1, wherein the data packet received on the first interface comprises data representative of a whole tone control sequence that comprises a plurality of tones.

9. The apparatus set forth in claim 8, wherein the tone control logic continuously transmits the whole tone control sequence until the predefined event.

10. The apparatus set forth in claim 9, wherein the data indicative of guard tone is a last tone in the data representative of a plurality of tones.

11. The apparatus set forth claim 1, wherein a plurality of data packets comprising data representative of a tone and data representative of a timestamp are received on the first communication interface; and
wherein the tone control logic is operative to transmits tones based on the data representative of a tone ordered by the data representative of a timestamp.

12. The apparatus set forth claim 1, wherein the first network is an Internet Protocol (IP) network and the first communication interface receives IP packets on the first communication interface.

13. The apparatus set forth in claim 12, wherein the second communication interface communicates with a plurality of wireless transceivers that are coupled to the second communication interface.

14. The apparatus set forth claim 1, wherein the data packet received on the first communication interface comprises data representative of a tone frequency, a tone power level and a tone duration.

15. The apparatus set forth claim 1, wherein the tone control logic further comprises a memory for storing a history of data packets received on the communication interface;
wherein the first communication interface is coupled to an internet protocol network and the first communication interface communicates with an internet protocol network so as to received data therefrom;
wherein the second communication interface communicates with a plurality of wireless transceivers controllable by tone signals;
wherein the data received on the first communication interface comprises a plurality of data packets comprising a timestamp and data representative of a plurality of tones;
wherein the tone control logic sorts the plurality of data packets by timestamp;
wherein the tone control logic stores timestamp data from the plurality of data packets in the memory;
wherein the tone control logic discards a duplicate packet from the plurality of data packets responsive to determining another packet with the same timestamp was already received based on timestamp data stored in the memory;

wherein the tone control logic transmits tones on the second communication interface in order by timestamps of the received data packets;

wherein the tone control logic continuously transmits a guard tone on the second communication interface responsive to the one of the plurality of data packets containing data indicative of the guard tone;

wherein the tone control logic transmits an audio signal with the guard tone responsive to receiving data representative of an audio signal on the first communication interface;

wherein the tone control logic transmits the guard tone until transmission of the audio signal is completed;

wherein the data representative of a guard tone is contained in a duration field for a tone; and wherein a value of zero in the duration field indicates the tone is a guard tone.

16. A method, comprising:

receiving a single data packet comprising tone data on a first interface;

determining the tone data contains data representative of a guard tone;

transmitting a guard tone on a second interface responsive to determining the tone data contains data representative of a guard tone;

receiving data packets containing data representative of audio tones on the first interface;

converting the data representative of audio tones to audio tones;

transmitting the audio tones on the second interface; and wherein the guard tone is transmitted on the second interface before transmitting the audio tones, the guard tone is transmitted uninterrupted while data representative of audio data is received on the first interface.

17. The method of claim 16, further comprising:

receiving a plurality of data packets containing tone data, each of the plurality of data packets, comprising a timestamp; and acquiring the timestamp from each of the plurality of data packets.

18. The method of claim 17, further comprising sorting the packets by timestamp; and generating tone frequencies corresponding to the tone data in the packets in sorted order.

19. The method of claim 17 determining whether at least one of the plurality of data packets is a duplicate of a previously received data packet; and discarding the at least one of the plurality of data packets responsive to determining the at least one of the plurality of data packets is a duplicate of the previously received packet;

wherein the at least one of the plurality of data packets is determined to be a duplicate when having a timestamp matching the previously received data packet.

20. A non-transitory computer-readable medium having encoded computer readable instructions for execution by a processor stored thereon, and when executed by a processor, operable to:

receive a plurality of data packets, each of the plurality of data packets containing tone data and a timestamp from a first communication interface;

sort the plurality of data packets by timestamp;

discard at least one packet having a duplicate timestamp of a second packet;

generate tone frequencies based on the sorted data packets on a second communication interface; and transmit a guard tone corresponding to the generated tone frequencies on the second interface responsive to determining one of the plurality of data packets contains data representative of a guard tone;

wherein an audio signal is transmitted on the second interface corresponding to the data representative of an audio signal received on the first interface; and wherein the guard tone is transmitted before transmitting the audio signal, the guard tone is transmitted uninterrupted for as long as data representative of the audio signal is received within a guard time.

* * * * *